(12) United States Patent
Luo

(10) Patent No.: US 9,350,927 B2
(45) Date of Patent: May 24, 2016

(54) IMAGE SENSOR AND COMPENSATION METHOD THEREOF

(71) Applicant: Silicon Optronics, Inc., Hsinchu (TW)

(72) Inventor: Xiaodong Luo, Hsinchu (TW)

(73) Assignee: Silicon Optronics, Inc., Hsinchu (TW)

( * ) Notice: Subject to any disclaimer, the term of this patent is extended or adjusted under 35 U.S.C. 154(b) by 86 days.

(21) Appl. No.: 14/324,666

(22) Filed: Jul. 7, 2014

(65) Prior Publication Data

US 2015/0077598 A1    Mar. 19, 2015

(30) Foreign Application Priority Data

Sep. 18, 2013  (TW) .............................. 102133804 A

(51) Int. Cl.
*H04N 5/361*   (2011.01)
*H04N 101/00*  (2006.01)

(52) U.S. Cl.
CPC ............ *H04N 5/361* (2013.01); *H04N 2101/00* (2013.01)

(58) Field of Classification Search
CPC ..... H04N 5/243; H04N 5/357; H04N 5/3575; H04N 5/361; H04N 5/378
See application file for complete search history.

(56) References Cited

U.S. PATENT DOCUMENTS

| | | | | |
|---|---|---|---|---|
| 6,441,684 B1 * | 8/2002 | Nakamura | ................ | H04N 5/20 250/214 AG |
| 6,965,332 B2 * | 11/2005 | Nakamura | .......... | H03M 1/0687 341/118 |
| 8,749,670 B1 * | 6/2014 | Liu | ........................ | H04N 5/361 348/243 |
| 2005/0007461 A1 * | 1/2005 | Chou | ................... | H04N 5/3575 348/222.1 |
| 2008/0218609 A1 * | 9/2008 | Blanquart | .............. | H04N 5/378 348/243 |
| 2009/0059012 A1 * | 3/2009 | Noguchi | ............. | H03M 1/1019 348/187 |
| 2011/0058073 A1 * | 3/2011 | Liu | ........................ | H04N 5/361 348/243 |
| 2011/0090238 A1 * | 4/2011 | Dong | .................... | H04N 5/335 345/589 |
| 2011/0141291 A1 * | 6/2011 | Dong | .................... | H04N 5/361 348/187 |
| 2011/0157435 A1 * | 6/2011 | Gerstenberger | ..... | H04N 5/3658 348/243 |
| 2011/0205386 A1 * | 8/2011 | Koseki | ................... | H04N 5/378 348/222.1 |
| 2011/0221938 A1 * | 9/2011 | Leung | .................. | H04N 5/3575 348/243 |
| 2013/0016259 A1 * | 1/2013 | Meng | .................... | H04N 5/378 348/294 |
| 2014/0146210 A1 * | 5/2014 | Lee | ........................ | H04N 5/361 348/302 |
| 2015/0116533 A1 * | 4/2015 | Hsu | ........................ | H04N 5/361 348/223.1 |
| 2015/0181149 A1 * | 6/2015 | Awatani | ............. | H04N 5/37455 348/300 |

* cited by examiner

*Primary Examiner* — Timothy J Henn
(74) *Attorney, Agent, or Firm* — Muncy, Geissler, Olds & Lowe, P.C.

(57) ABSTRACT

An image sensor is provided. The image sensor includes a pixel array, an analog-to-digital converter, and a processor. The analog-to-digital converter converts a black level reference signal and a pix signal from the pixel array into a first digital signal and a second digital signal, respectively. The processor obtains a black level reference value according to the first digital signal, and obtains a compensation coefficient according to the black level reference value, a maximum digital level of the analog-to-digital converter and a full signal range value. The processor obtains pix data according to the compensation coefficient, the black level reference value and the second digital signal.

14 Claims, 2 Drawing Sheets

IMAGE SENSOR AND COMPENSATION METHOD THEREOF

CROSS REFERENCE TO RELATED APPLICATIONS

This Application claims priority of Taiwan Patent Application No. 102133804, filed on Sep. 18, 2013, the entirety of which is incorporated by reference herein.

BACKGROUND OF THE INVENTION

1. Field of the Invention

The invention relates to an image sensor, and more particularly to an image sensor capable of automatically compensating signal range.

2. Description of the Related Art

A semiconductor image sensor (e.g. a charge-coupled device (CCD) or a complementary metal oxide semiconductor (CMOS) sensor), commonly implemented in a camera or a camcorder, is used to convert the visible light images into electronic signals, so as to perform subsequent storage, transmission or display.

Due to the imperfect nature of electronic circuits, an image sensor still has a leakage current (or dark signal) when no light is received. The unwanted dark signal will be combined in useful data signals, and worse, the dark signal cannot be distinguished from the data signal. The combination of the dark signal will sacrifice an image dynamic range, and will reduce the image contrast, thereby reducing the image quality. For example, if a black level is too high, information in a bright area may be lost, and may sacrifice the signal range. Therefore, in order to avoid or calibrate the dark signal, a black level calibration (BLC) is usually performed. The black level calibration can accurately obtain a digital image with the full contrast and tiny details in a dark area.

BRIEF SUMMARY OF THE INVENTION

An image sensor and a compensation method thereof are provided. An embodiment of an image sensor is provided. The image sensor comprises a pixel array, an analog-to-digital converter, and a processor. The analog-to-digital converter converts a black level reference signal and a pix signal from the pixel array into a first digital signal and a second digital signal, respectively. The processor obtains a black level reference value according to the first digital signal, and obtains a compensation coefficient according to the black level reference value, a maximum digital level of the analog-to-digital converter and a full signal range value. The processor obtains pix data according to the compensation coefficient, the black level reference value and the second digital signal.

Furthermore, an embodiment of a compensation method for an image sensor is provided, wherein the image sensor comprises a pixel array and an analog-to-digital converter. A black level reference signal from the pixel array is converted into a first digital signal, by the analog-to-digital converter. A pixel signal from the pixel array is converted into a second digital signal, by the analog-to-digital converter. A black level reference value is obtained according to the first digital signal. A compensation coefficient is obtained according to the black level reference value, a maximum digital level of the analog-to-digital converter and a full signal range value. Pixel data is obtained according to the compensation coefficient, the black level reference value and the second digital signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
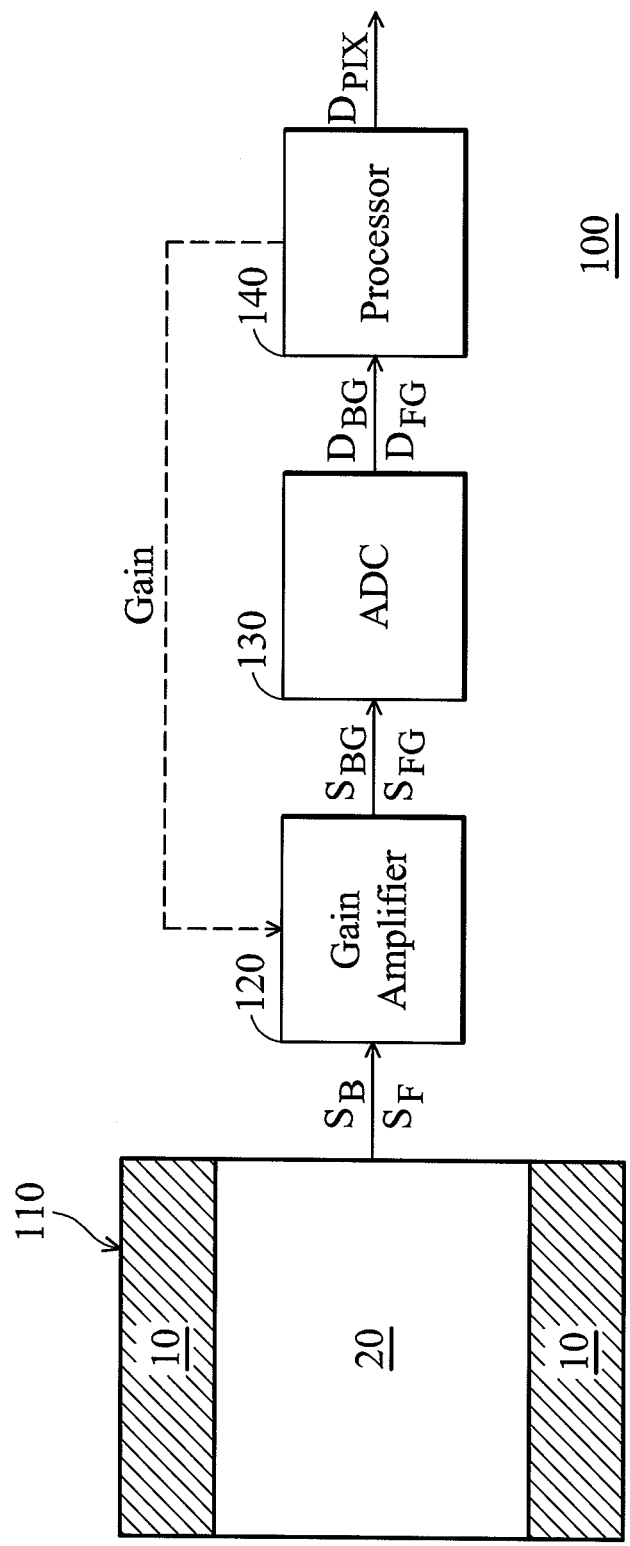
FIG. 1 shows an image sensor according to an embodiment of the invention.

FIG. 1 shows an image sensor 100 according to an embodiment of the invention. The image sensor 100 comprises a pixel array 110, a gain amplifier 120, an analog-to-digital converter (ADC) 130 and a processor 140. The pixel array 110 comprises a main sense area 20 and two black level sense areas 10 disposed at two sides of the main sense area 20. First, the gain amplifier 120 obtains a black level reference signal $S_B$ from the black level sense area 10 of the pixel array 110, wherein the black level reference signal $S_B$ comprises the signals of each pixel of each reference line in the black level sense area 10. Next, according to the black level reference signal $S_B$, the gain amplifier 120 provides a signal $S_{BG}$ to the ADC 130. Next, the ADC 130 converts the signal $S_{BG}$ into a digital signal $D_{BG}$, and provides the digital signal $D_{BG}$ to the processor 140. Next, the processor 140 obtains a current black level reference value BLC according to the digital signal $D_{BG}$ (e.g. average). In the embodiment, the ADC 130 is a N-bit ADC, which converts an analog signal into a digital signal, wherein the digital signal has a plurality of levels corresponding to a signal range of the analog signal. For example, if N is 10, the levels of the digital signal are from 0 (i.e. "0000000000") to 1023 (i.e. "1111111111"), wherein 1023 is a maximum digital level of a 10-bit analog-to-digital converter, i.e. $2^{10}-1$. In general, the image sensor will use an ADC having a higher bit number to convert the analog signal for black level calibration. For example, the image sensor 100 is capable of providing a full signal range value with 10 bits, i.e. the full signal range of the image sensor 100 is from 0 to 1023. Therefore, in order to obtain sufficient signal level, the image sensor 100 may use 10.5-bit or 11-bit ADC to convert the analog signal into the digital signal, wherein the levels of the digital signal of the 10.5-bit ADC are from 0 to 1535, i.e. the maximum digital level of 10.5-bit ADC is 1535, and the levels of the digital signal of the 11-bit ADC are from 0 to 2047, i.e. the maximum digital level of 11-bit ADC is 2047. Specifically, in the image sensor 100, the maximum digital level of the ADC 130 is larger than the full signal range value that the image sensor 100 can provide. Next, the processor 140 can obtain a compensation coefficient SRE according to the following formula (1):

$$SRE = full\_range / (max\_full\_signal - BLC) \quad (1),$$

wherein full_range represents the full signal range value of the image sensor 100, max_full_signal represent the maximum digital level of the ADC 130, and BLC represents the current black level reference value. Next, the gain amplifier 120 obtains a pixel signal $S_F$ from the pixel array 110, wherein the pixel signal $S_F$ comprises the signals of each pixel of each row of the core area 20 and the black level sense area 10. Next, according to the pixel signal $S_F$, the gain amplifier 120 provides a signal $S_{FG}$ to the ADC 130. Next, the ADC 130 converts the signal $S_{FG}$ into a digital signal $D_{FG}$, and provides the digital signal $D_{FG}$ to the processor 140. Next, the processor 140 generates pixel data $D_{PIX}$ according to the compensation coefficient SRE, the digital signal $D_{FG}$ and the black level reference value BLC. In the embodiment, if the compensation coefficient SRE is smaller than or equal to 1, the processor 140 can obtain the pixel data $D_{PIX}$ according to the following formula (2):

$$D_{PIX}=D_{FG}-BLC=DIFF \qquad (2).$$

Specifically, when the compensation coefficient SRE is smaller than or equal to 1, the pixel data $D_{PIX}$ is determined by a difference DIFF between the digital signal $D_{FG}$ and the black level reference value BLC. In other words, the digital signal $D_{FG}$ received by the processor 140 still has a sufficient signal range after a black level calibration is performed. Furthermore, if the compensation coefficient SRE is larger than 1, the processor 140 obtains the pixel data $D_{PIX}$ according to the following formula (3):

$$D_{PIX}=(D_{FG}-BLC)\times SRE=DIFF\times SRE \qquad (3).$$

Specifically, when the compensation coefficient SRE is larger than 1, the processor 140 adjusts the difference between the digital signal $D_{FG}$ and the black level reference value BLC according to the compensation coefficient SRE, to determine the pixel data $D_{PIX}$. In other words, the processor 140 can suitably amplify the difference DIFF between the digital signal $D_{FG}$ and the black level reference value BLC according to the compensation coefficient SRE, so as to increase the signal range. In the embodiment, the image sensor 100 adjusts the difference DIFF between the digital signal $D_{FG}$ and the black level reference value BLC by using a digital gain via the processor 140. For example, the processor 140 can use a subtractor to obtain the difference DIFF between the digital signal $D_{FG}$ and the black level reference value BLC, and use a digital multiplier to amplify the difference DIFF. Therefore, after the black level calibration is performed, the amplified pixel signal has a sufficient signal range. Thus, according to the embodiment, the image sensor 100 can suitably adjust the difference DIFF between the digital signal $D_{FG}$ and the black level reference value BLC according to the compensation coefficient SRE, to obtain the best image dynamic range. Therefore, image contrast and image quality are improved.

Furthermore, in one embodiment, after obtaining the compensation coefficient SRE, the processor 140 further provides a gain signal Gain to the gain amplifier 120 according to the compensation coefficient SRE, so as to adjust the gain of the gain amplifier 120. In one embodiment, the processor 140 provides the gain signal Gain to the digital multiplier. Next, the gain amplifier 120 will re-obtain the black level reference signal $S_B$ from the black level sense area 10 of the pixel array 110. Next, according to the black level reference signal $S_B$ and the gain signal Gain, the gain amplifier 120 provides the amplified signal $S_{BG}$ to the ADC 130. For example, when the compensation coefficient is greater than 1, the processor 140 provides the gain signal Gain corresponding to the compensation coefficient SRE to the gain amplifier 120, i.e. $S_{BG}=S_B\times SRE$. Conversely, when the compensation coefficient is smaller than or equal to 1, the processor 140 provides the gain signal Gain corresponding to a unity gain to the gain amplifier 120, i.e. $S_{BG}=S_B\times 1$. Next, the ADC 130 converts the amplified signal $S_{BG}$ into the digital signal $D_{BG}$, and provides the digital signal $D_{BG}$ to the processor 140. Next, the processor 140 can obtain the amplified black level reference value BLC according to the digital signal $D_{BG}$. Furthermore, the gain amplifier 120 obtains a pixel signal $S_F$ from the pixel array 110. Next, according to the pixel signal $S_F$ and the gain signal Gain, the gain amplifier 120 provides the amplified signal $S_{FG}$ to the ADC 130, i.e. $S_{FG}=S_F\times SRE$. Next, the ADC 130 converts the amplified signal $S_{FG}$ into the digital signal $D_{FG}$, and provides the digital signal $D_{FG}$ to the processor 140. Next, the processor 140 obtains the pixel data $D_{PIX}$ according to the difference between the amplified digital signal $D_{FG}$ and the amplified black level reference value BLC. In the embodiment, the image sensor 100 uses an analog gain to adjust the difference between the digital signal $D_{FG}$ and the black level reference value BLC via the gain amplifier 120. In another embodiment, in response to the compensation coefficient SRE, the image sensor 100 can adjust the difference between the digital signal $D_{FG}$ and the black level reference value BLC by simultaneously using the gain amplifier 120 and the processor 140.

Figure 2:
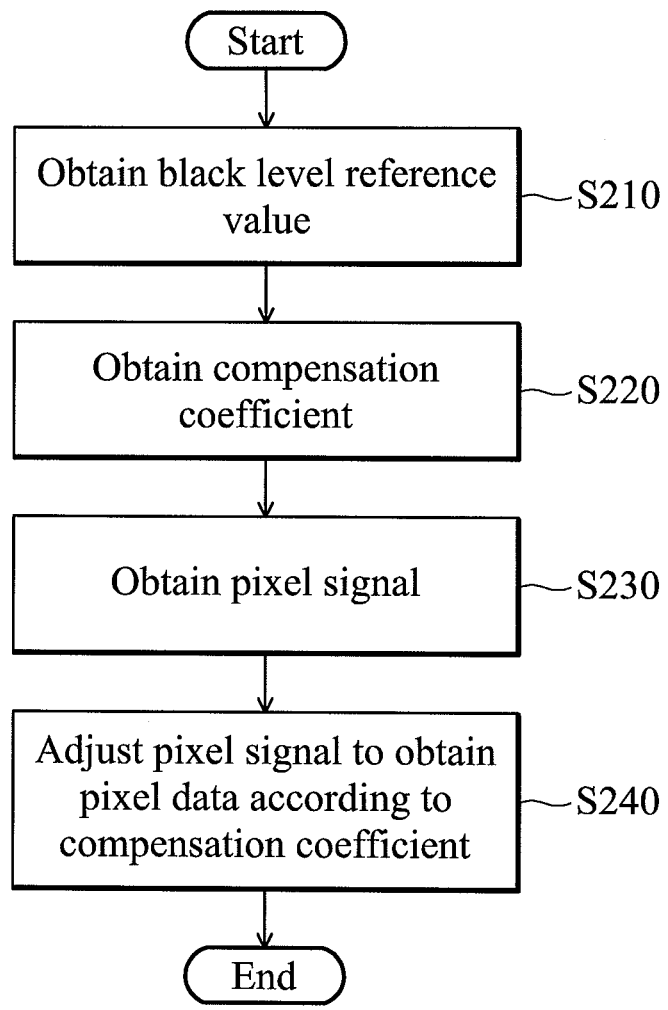
FIG. 2 shows a compensation method for an image sensor according to an embodiment of the invention.

FIG. 2 shows a compensation method for an image sensor according to an embodiment of the invention. Referring to FIG. 1 and FIG. 2 together, first, in step S210, the processor 140 can obtain the current black level reference value BLC according to the digital signal $D_{BG}$ corresponding to the black level reference signal $S_B$. As described above, the black level reference signal $S_B$ comprises the signals of each pixel of each reference line in the black level sense area 10. Next, in step S220, the processor 140 obtains the compensation coefficient SRE according to the full signal range value full_range of the image sensor 100, the maximum digital level max_full_signal of the ADC 130 and the current black level reference value BLC, as described in the above formula (1). Next, in step S230, the processor 140 can obtain the digital signal $D_{FG}$ corresponding to the pixel signal $S_F$, wherein the pixel signal $S_F$ comprises the signals of each pixel of each row line in the core area 20 and the black level sense area 10. Next, in step S240, the image sensor 100 can generate the pixel data $D_{PIX}$ having sufficient signal range according to the compensation coefficient SRE, the digital signal $D_{FG}$ and the black level reference value BLC. In the embodiment, the image sensor 100 can use the processor 140 and/or the gain amplifier 120 to suitably adjust the difference between the digital signal $D_{FG}$ and the black level reference value BLC, such that the pixel data has a sufficient signal range after the black level calibration is performed. For example, when the compensation coefficient SRE is less than or equal to 1, the pixel data $D_{PIX}$ is determined according to the difference DIFF between the digital signal $D_{FG}$ and the black level reference value BLC, i.e. the pixel data $D_{PIX}$ has the sufficient signal range without compensation. Conversely, when the compensation coefficient SRE is larger than 1, the image sensor 100 adjusts the difference DIFF between the digital signal $D_{FG}$ and the black level reference value BLC according to the compensation coefficient SRE, to determine the pixel data $D_{PIX}$. Therefore, after the black level calibration is performed, the pixel data provided by the image sensor 100 has the sufficient signal range. Furthermore, the image sensor 100 may use the processor 140 and/or the gain amplifier 120 to suitably adjust the difference between the digital signal $D_{FG}$ and the black level reference value BLC. Therefore, the pixel data $D_{PIX}$ has the sufficient signal range without additional amplifying circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image sensor, comprising:
   a pixel array;
   an analog-to-digital converter, converting a black level reference signal and a pix signal from the pixel array into a first digital signal and a second digital signal, respectively; and
   a processor, obtaining a black level reference value according to the first digital signal, and obtaining a compensation coefficient according to the black level reference value, a maximum digital level of the analog-to-digital converter and a full signal range value,
   wherein the processor obtains pix data according to the compensation coefficient, the black level reference value and the second digital signal.

2. The image sensor as claimed in claim 1, wherein the processor obtains the compensation coefficient according to a ratio of the full signal range value and a first difference between the black level reference value and the maximum digital level of the analog-to-digital converter.

3. The image sensor as claimed in claim 2, wherein the processor obtains the pixel data by multiplying a second difference between the second digital signal and the black level reference value by the compensation coefficient when the compensation coefficient is larger than 1, and the processor obtains the pixel data according to the second difference when the compensation coefficient is smaller than or equal to one.

4. The image sensor as claimed in claim 1, further comprising:
   a gain amplifier coupled between the pixel array and the analog-to-digital converter.

5. The image sensor as claimed in claim 4, wherein when the compensation coefficient is larger than 1, the processor provides a gain signal corresponding to the compensation coefficient to the gain amplifier, and when the compensation coefficient is smaller than or equal to 1, the processor provides the gain signal corresponding to a unity gain to the gain amplifier, wherein the gain amplifier amplifies the black level reference signal and the pixel signal according to the gain signal from the processor.

6. The image sensor as claimed in claim 5, wherein the analog-to-digital converter converts the amplified black level reference signal and the amplified pixel signal into the first digital signal and the second digital signal.

7. The image sensor as claimed in claim 1, wherein the analog-to-digital converter is an N-bit analog-to-digital converter, and the maximum digital level of the analog-to-digital converter is equal to $(2^N-1)$.

8. The image sensor as claimed in claim 1, wherein the full signal range value is smaller than the maximum digital level of the analog-to-digital converter.

9. A compensation method for an image sensor, wherein the image sensor comprises a pixel array, a processor and an analog-to-digital converter coupled between the pixel array and the processor, the method comprising:
   converting a black level reference signal from the pixel array into a first digital signal, by the analog-to-digital converter;
   converting a pixel signal from the pixel array into a second digital signal, by the analog-to-digital converter;
   obtaining a black level reference value according to the first digital signal, by the processor;
   obtaining a compensation coefficient according to the black level reference value, a maximum digital level of the analog-to-digital converter and a full signal range value, by the processor; and
   obtaining pixel data according to the compensation coefficient, the black level reference value and the second digital signal, by the processor,
   wherein the step of obtaining the compensation coefficient further comprises:
      obtaining a first difference between the black level reference value and the maximum digital level of the analog-to-digital converter; and
      obtaining the compensation coefficient according to a ratio of the full signal range value and the first difference,
   wherein the step of obtaining the pixel data further comprises:
      multiplying a second difference between the second digital signal and the black level reference value by the compensation coefficient when the compensation coefficient is larger than 1, to obtain the pixel data; and
      obtaining the pixel data according to the second difference when the compensation coefficient is smaller than or equal to 1.

10. The compensation method as claimed in claim 9, further comprising:
    amplifying the black level reference signal and the pixel signal according to a gain signal.

11. The compensation method as claimed in claim 10, wherein the gain signal corresponds to the compensation coefficient when the compensation coefficient is larger than 1, and the gain signal corresponds to a unity gain when the compensation coefficient is smaller than or equal to 1.

12. The compensation method as claimed in claim 11, wherein the analog-to-digital converter converts the amplified black level reference signal and the amplified pixel signal into the first digital signal and the second digital signal.

13. The compensation method as claimed in claim 9, wherein the analog-to-digital converter is an N-bit analog-to-digital converter, and the maximum digital level of the analog-to-digital converter is equal to $(2^N-1)$.

14. The compensation method as claimed in claim 9, wherein the full signal range value is smaller than the maximum digital level of the analog-to-digital converter.

* * * * *